United States Patent [19]
Hansen

[11] Patent Number: 6,078,494
[45] Date of Patent: Jun. 20, 2000

[54] MULTILAYER CAPACITOR COMPRISING BARIUM-TITANATE DOPED WITH SILVER AND RARE EARTH METAL

[75] Inventor: Peter Hansen, Aachen, Germany

[73] Assignee: U.S. Philips Corporation, New York, N.Y.

[21] Appl. No.: 09/120,627

[22] Filed: Jul. 22, 1998

[30] Foreign Application Priority Data

Aug. 28, 1997 [DE] Germany .......................... 197 37 324

[51] Int. Cl.$^7$ .......................... H01G 7/00; H01G 4/06
[52] U.S. Cl. .................. 361/321.5; 501/136; 501/137
[58] Field of Search ................... 361/311, 312, 361/321.1, 321.2, 321.3, 321.4, 321.5; 501/134–139; 29/25.42

[56] References Cited

U.S. PATENT DOCUMENTS

| | | | |
|---|---|---|---|
| 5,319,517 | 6/1994 | Nomura et al. ....................... | 361/321.5 |
| 5,335,139 | 8/1994 | Nomura et al. ....................... | 361/321.5 |
| 5,337,209 | 8/1994 | Sutherland et al. .................. | 361/321.5 |
| 5,889,647 | 3/1999 | Hansen et al. ....................... | 361/321.5 |

Primary Examiner—Kristine Kincaid
Assistant Examiner—Anthony Dinkins
Attorney, Agent, or Firm—Norman N. Spain

[57] ABSTRACT

A capacitor including a ceramic dielectric of a dielectric ceramic composition including a doped barium-calcium-zirconium-titanate of the composition $(Ba_{1-\alpha-\mu-v}A_\mu D_v Ca_\alpha)[Ti_{1-x-\delta-\mu'-v'}Mn_\delta A'_{\mu'}Zr_x]_z O_3$, where A=Ag, A'=Dy, Er, Ho, Y, Yb and Ga; D=Nd, Pr, Sm, Gd; D'=Nb, Mo, $0.10 \leq x \leq 0.25$, $0 \leq \mu \leq 0.01$, $0 \leq \mu' \leq 0.01$, $0 \leq v \leq 0.01$, $0$ v'0.01, $0 < \delta \leq 0.01$ and $0.995 \leq z < 1$ and $0 \leq \alpha \leq 0.05$, and including at least two electrodes, is characterized by a high dielectric constant K and a long service life, a low loss factor, a high insulation resistance and a capacitance with a low voltage dependence. The temperature dependence of its dielectric constant K corresponds to the EIA-standard Y5V.

8 Claims, 1 Drawing Sheet

MULTILAYER CAPACITOR COMPRISING BARIUM-TITANATE DOPED WITH SILVER AND RARE EARTH METAL

BACKGROUND OF THE INVENTION

The invention relates to a capacitor comprising a dielectric of a dielectric ceramic composition, which includes a doped barium-calcium-zirconium-titanate, and at least two electrodes. The invention particularly relates to a multilayer capacitor having inner electrodes of base metals.

Ceramic multilayer capacitors are customarily manufactured by means of layers of a green dielectric ceramic composition for the dielectric and layers of a metal paste for the inner electrodes which are alternately arranged one on top of the other, and finally this stack of ceramic and metal layers is subjected to a sintering operation.

The quality of ceramic multilayer capacitors is determined by the chemical composition of the material for the dielectric and for the electrodes as well as by the manufacturing conditions. In the manufacturing process, particularly the sintering conditions play an important part. Dependent upon the sintering atmosphere, various opposed oxidation and reduction reactions may take place during sintering. If sintering takes place in a reducing atmosphere, barium titanate and its derivatives, for example, the doped barium-calcium-zirconium-titanates, become semiconductive. In this condition, they cannot be used as a dielectric. Multilayer capacitors can only be sintered under oxidizing conditions if the electrode material is composed of rhodium, palladium or platinum. However, rhodium and platinum are very expensive, i.e. their share of the manufacturing cost may be as much as 50%. Therefore, the trend is towards replacing rhodium and platinum by the much cheaper nickel or its alloys. However, nickel oxidizes when sintering takes place under oxidizing conditions, so that multilayer capacitors comprising nickel electrodes must be sintered in an inert or slightly reducing atmosphere. In principle, sintering in a reducing atmosphere would cause the tetravalent titanium in barium titanate to be reduced to trivalent titanium, which leads to an extreme reduction of the insulation resistance of the capacitors. In the meantime, however, the reducibility of titanium in barium titanate has been diminished by means of additives, which are acceptors, such as $Cr_2O_3$, $Co_2O_3$ or MnO.

However, doping with these additives does not preclude the formation of oxygen vacancies in the crystal during sintering in a reducing atmosphere, which oxygen vacancies drastically reduce the service life of the capacitors. The oxygen vacancies exhibit a high mobility in the crystal lattice and migrate under the influence of electric voltages and temperature. As a result, the insulation resistance decreases with time.

The formation of oxygen vacancies can be partly undone when, after sintering in a reducing atmosphere, the capacitors are tempered in a slightly oxidizing atmosphere at temperatures ranging between 600 and 1100° C. In this process, the oxygen vacancies in the lattice are filled up again. A disadvantage of said tempering treatment is the clear reduction of the dielectric constant $\epsilon$ and the negative effect on the $\Delta C/\Delta t$ curve, i.e. the temperature-dependence of the dielectric constant.

To overcome these complex problems in the manufacture of ceramic capacitors comprising base-metal electrodes, U.S. Pat. No. 5,319,517 discloses a ceramic multilayer chip capacitor comprising inner electrodes and dielectric layers, whose dielectric material includes a dielectric oxide of the following composition: $[(Ba_{1-x-y}Ca_xSr_y)O]_m(Ti_{1-x}Zr_x)O_2$, where $0 \leq x \leq 0.25$, $0 \leq y \leq 0.05$, $0.1 \leq z \leq 0.3$ and $1,000 \leq m \leq 1,020$, and to which material there is added a manganese oxide and/or a compound, which is converted into the oxide during firing, in a quantity ranging from 0.01 to 0.5% by weight, calculated with respect to oxide (MnO), an yttrium oxide and/or a compound, which is converted into the oxide during firing, in a quantity ranging from 0.05 to 0.5% by weight, calculated with respect to oxide ($Y_2O_3$), a vanadium oxide and/or a compound, which is converted into the oxide during firing, in a quantity ranging from 0.005 to 0.3% by weight, calculated with respect to oxide ($V_2O_5$), a tungsten oxide and/or a compound, which during firing is converted into the oxide, in a quantity ranging from 0.005 to 0.3% by weight, calculated with respect to oxide (MnO), and which comprises nickel or a nickel alloy as the material for the inner electrodes. However, the ever increasing requirements in terms of service life and reliability cannot be met, as yet, by these multilayer capacitors.

SUMMARY OF THE INVENTION

Therefore, it is an object of the invention to provide a ceramic capacitor comprising a dielectric of a dielectric ceramic composition, which includes a doped barium-calcium-zirconium-titanate, and at least two electrodes, which capacitor is characterized by an improved service life, greater reliability, a high dielectric constant and a low temperature-dependence of the dielectric constants over a wide temperature range.

In accordance with the invention, this object is achieved by a capacitor comprising a dielectric of a dielectric ceramic composition, which includes a doped barium-calcium-zirconium-titanate of the composition $(Ba_{1-\alpha-\mu-\nu}A_\mu D_\nu Ca_\alpha)$ $[Ti_{1-x-\delta-\mu'-\nu'}Mn_\delta A'_{\mu'}D'_{\nu'}Zr_x]_zO_3$, where A=Ag, A'=Dy, Er, Ho, Y, YbGa; D=Nd, Pr, Sm, Gd; D'=Nb, Mo; $0.10 \leq x \leq 0.25$; $0 \leq \mu \leq 0.01$; $0 \leq \mu' \leq 0.01$; $0 \leq \nu \leq 0.01$; $0 \leq \nu' \leq 0.01$; $0 < \delta \leq 0.01$ and $0.995 \leq z < 1.0 \leq \alpha \leq 0.05$ and comprising at least two electrodes.

Said capacitor is characterized by a high dielectric constant K and a high stability of the capacitance value, a long service life, a low loss factor, a high insulation resistance and a capacitance with a low voltage-dependence. The temperature dependence of the dielectric constant K corresponds to the EIA-standard Y5V. The field of application comprises, in particular, coupling and decoupling as well as interference suppression at low-voltage applications. This composition having properly proportioned quantities of donors; D, D' and acceptors A, A' enables a low ion mobility and hence a very long service life at high temperatures and electric fields to be attained. Meanwhile, the acceptor concentration is sufficiently high to control the redox reactions taking place during sintering the multilayer capacitors comprising base metal electrodes, and to achieve a controlled grain growth.

Within the scope of the invention, it is preferred that the doped barium-calcium-zirconium-titanate has the composition $(Ba_{0.96-\nu}D_\nu Ca_{0.04})$ $[Ti_{1-x-\delta-\mu'}Mn_\delta A'_{\mu'}Zr_x]_z$ $O_3$, wherein A'=Dy, Er,Ho, Y, Yb; D=Nd, Pr, Sm, Gd; $0.10 \leq x \leq 0.25$; $0 \leq ; \mu' \leq 0.01$, $0 \leq \nu \leq 0.01$, $0 < \delta \leq 0.01$ and $0.995 \leq z \leq 1$. This composition of the barium-calcium-zirconium-titanate ensures an optimum grain growth and a high, maximum dielectric constant.

It may alternatively be preferred that the doped barium-calcium-zirconium-titanate has the composition $(Ba_{0.96-\mu-\nu}A_\mu D_\nu Ca_{0.04})[Ti_{1-x-\delta}Mn_\delta Zr_x]_zO_3$ wherein A=Ag, D=Nd, Pr, Sm, Gd; $0.10 \leq x \leq 0.25$; $0 \leq \mu \leq 0.01$, $0 \leq \nu \leq 0.01$, $0 < \delta \leq 0.01$ and $0.995 \leq z \leq 1$.

It may also be preferred that the doped barium-calcium-zirconium-titanate has the composition $(Ba_{0.96-\mu}A_\mu Ca_{0.04})[Ti_{1-x-\delta-v'}Mn_\delta D'_{v'}Zr_x]_zO_3$, wherein A=Ag, D'=Nb, Mo, $0.10 \leq x \leq 0.25$; $0 \leq \mu \leq 0.01$, $0 \leq v' \leq 0.01$, $0 < \delta \leq 0.01$ and $0.995 \leq z < 1$.

Within the scope of the invention, it is particularly preferred that the doped barium-calcium-zirconium-titanate has the composition $(Ba_{0.9575}Nd_{0.0025}Ca_{0.04})[Ti_{0.995-x}Mn_{0.0025}Y_{0.0025}Zr_x]_zO_3$, wherein $0.18 \leq x \leq 0.22$, and $0.995 \leq z \leq 0.999$.

Within the scope of the invention it is preferred that the material for the electrodes is nickel or a nickel alloy.

It is particularly preferred that the capacitor is a multilayer capacitor comprising inner electrodes of nickel or a nickel alloy.

It may alternatively be preferred that the dielectric ceramic composition comprises 0.1–1% by weight of a sintering aid.

These and other aspects of the invention will be apparent from and elucidated with reference to the embodiments described hereinafter.

BRIEF DESCRIPTION OF THE DRAWINGS

The sole FIGURE of the drawing is a cross-sectional view of a capacitor of the invention.

DETAILED DESCRIPTION OF THE INVENTION

Figure 1:
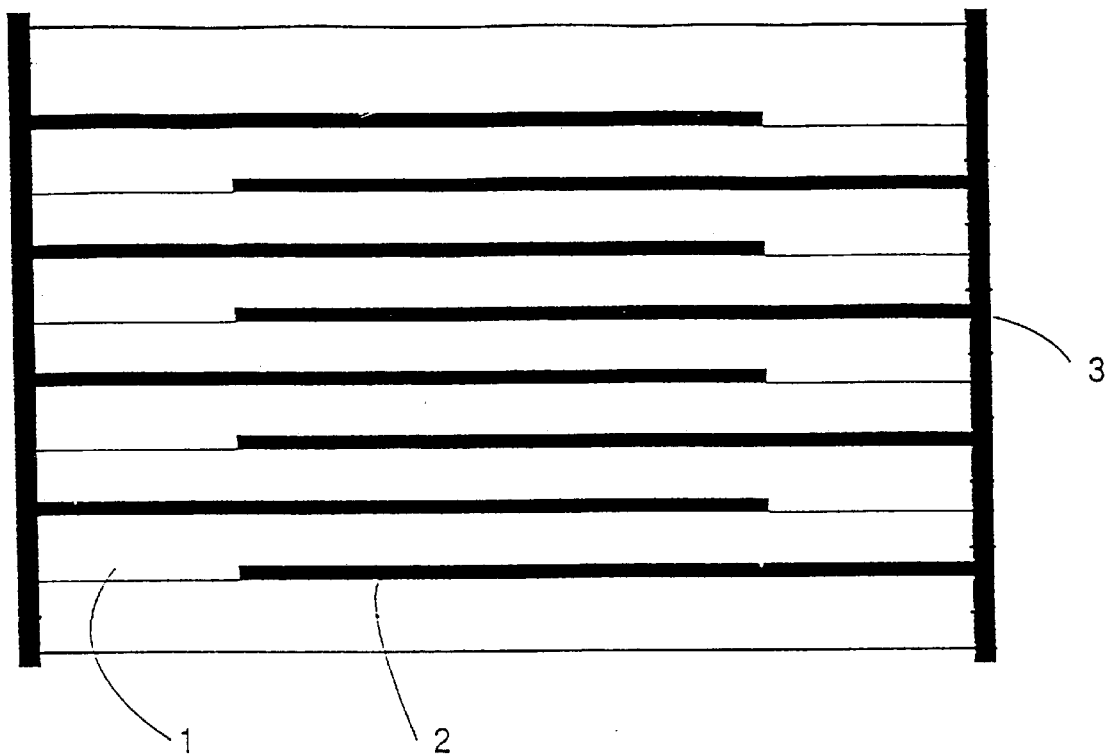

The invention will now be described in greater detail with reference to FIG. 1 which shows a cross-sectional view of an embodiment of the capacitor in accordance with the invention. In this preferred embodiment, the capacitor in accordance with the invention is a multilayer capacitor.

The ceramic multilayer capacitor in accordance with the invention comprises a ceramic dielectric 1, which is composed of a plurality of oxidic dielectric layers having a thickness in the range from 2 to 20 $\mu$m, as well as a plurality of inner electrodes 2 which lie stratified in the dielectric and which extend alternately to two opposing end faces of The dielectric. The end faces of the ceramic dielectric are provided with metallic contact electrodes 3 which serve as external connections which are connected to the corresponding metallic inner electrodes.

The manufacturing techniques customarily used to produce ceramic capacitors are also used to manufacture the capacitor in accordance with the invention, whereby, dependent upon the desired shape and dimensions, the required accuracy and the field of application, many manufacturing variants are possible.

The material for the ceramic dielectric is a dielectric ceramic composition comprising a doped barium-calcium-zirconium-titanate of the composition $(Ba_{1-\alpha-\mu-v}A_\mu D_v Ca_\alpha)[Ti_{1-x-\delta-\mu'-v'}Mn_\delta A'_{\mu'}D'_{v'}Zr_x]_zO_3$, where A=Ag, A'=Dy, Er, Ho, Y, Yb,Ga; D=Nd, Pr, Sm, Gd; D'=Nb, Mo, $0.10 \leq x \leq 0.25$; $0 \leq \mu \leq 0.01$, $0 \leq \mu' \leq 0.01$, $0 \leq v \leq 0.01$, $0 \leq v' \leq 0.01$, $0 < \delta \leq 0.01$ and $0.995 \leq z \leq 0 \leq \alpha \leq 0.005$. This barium-calcium-zirconium-titanate has a perovskite structure of the general composition $ABO_3$, in which the rare earth metals Nd, Pr, Sm and Gd having a large ion radius are arranged at A-sites, and the rare earth metals Dy, Er, Ho, Y, Yb and Ga having a small ion radius are arranged at B-sites. The perovskite material includes the acceptor ions Ag, Dy, Er, Ho, Y or Yb and the donor ions Nb, Mo, Nd, Pr, Sm and Gd at lattice sites having a different local symmetry. Donors and acceptors form donor-acceptor complexes within the lattice structure of the barium-calcium-zirconium-titanate according to the invention. These additives cause the Curie temperature $T_c$ to be reduced. The Curie temperature is further determined by the zirconium content of the barium-calcium-zirconium-titanate.

Preferably, the dielectric ceramic composition comprises $SiO_2$ as the sintering aid in a quantity ranging from 0.125% by weight to 0.25% by weight. Instead of this standard sintering aid, a quantity of 0.1–1% by weight of a sintering aid composed of a mixture of 0.16 to 0.9 mol lithium oxide, 0.004 to 0.39 mol of one or more of the oxides CaO, MgO, BaO and SrO as well as 0.2 to 0.8 mol silicon oxide may be added to said dielectric ceramic composition. This sintering aid enables the sintering temperature to be reduced to less than 1200° C.

The material which can be used for the electrodes is not subject to particular limitations, so that a metal or a combination of two or more customarily used metals can be utilized. The electrodes may be composed of noble metals, such as platinum, palladium, gold or silver. They may also contain chromium, zirconium, vanadium, zinc, copper, tin, lead, manganese, molybdenum, tungsten, titanium or aluminium. The electrodes are preferably made of a base metal selected from the group formed by nickel, iron, cobalt and their alloys.

The dielectric ceramic composition can be prepared in accordance with the customary powder-manufacturing processes, such as the mixed-oxide process, co-precipitation, spray drying, sol/gel process, hydrothermal process or alkoxide process. Preferably, the mixed oxide process is used in which the starting oxides or thermally decomposable compounds, such as carbonates, hydroxides, oxalates or acetates, are mixed and ground. Subsequently, the starting powder is calcined at temperatures in the range from 1000° C. to 1400° C.

For shaping said starting powder so as to obtain a green body, use can also be made of all customary methods. For shaping ceramic multilayer capacitors, first, a suspension is prepared from the calcined powder, which suspension comprises, in addition to the powder, solvents, binders and, if necessary, softeners and dispersing aids. The solvent may be, for example, water, an alcohol, toluol, xylol or trichloroethylene. For the binder use is customarily made of organic polymers such as polyvinyl alcohol, polyvinyl butyrale or polymethyl methacrylate. For the softeners use can be made of glycerine, polyglycols or phtalates. In addition, dispersing agents such as alkyl aryl polyether alcohols, polyethylene glycol ethylether or octyl phenoxyethanol may be added to the suspension.

Subsequently, the preferred method is employed to manufacture green ceramic foils from the suspension by means of a foil-casting process. In this foil-casting process, the suspension is poured onto a moving bearing surface. Dependent upon the binder system, a more or less flexible foil remains after evaporation of the solvent, which foil is cut, printed with a metal paste in the pattern of the inner electrodes and laminated. The individual multilayer capacitors are cut from the laminate. Said multilayer capacitors are first sintered in a slightly reducing atmosphere at temperatures ranging between 1100 and 1400° C., whereafter they are tempered in a slightly oxidizing atmosphere at temperatures ranging between 600 and 1100° C. For the slightly reducing atmosphere use can be made of water vapor-saturated nitrogen with an admixture of 0.5 to 2% by volume of hydrogen, and for the slightly oxidizing atmosphere use can be made of nitrogen with 5 ppm to 100 ppm of oxygen.

To form the outer electrodes, a metal paste which contains, for example, nickel, is provided at the end faces of the capacitors and fired. The outer electrodes can alternatively be provided by vapor deposition of a metal layer, for example, of gold.

The sintered ceramic dielectric has a homogeneous microstructure with grain sizes below 5 $\mu$m.

To characterize the capacitors in accordance with the invention, the following measurements were carried out in known manner: the dielectric constant $\epsilon$ at 25° C., and the loss factor tg $\delta$. The service life T is measured in a highly accelerated life test (HALT) at 350° C. and 900 V. For this purpose, test pellets which contact electrodes and which have a diameter of 5 mm and a layer thickness of 0.05 mm are manufactured, heated to 350° C. and subjected to a voltage of 1800 V/mm. The current is measured, and this value is used to calculate the insulation resistance. At the beginning of the test, the insulations-resistance value is high, and it remains substantially constant at a high level. It is not until after a certain characteristic degradation time that the insulation resistance starts to decrease. The leakage current increases in a short period of time, i.e. compared to the duration of the measuring process up to then, by several orders of magnitude. The service life $\tau$ is defined as the period of time in which the leakage current has increased by one order of magnitude.

EXAMPLE 1

To manufacture a multilayer capacitor comprising a ceramic dielectric of the composition $(Ba_{0.9575}Nd_{0.0025}Ca_{0.04})[Ti_{0.815}Y_{0.0025}Zr_{0.18}Mn_{0.0025}]_{0.997}O_3$, and 0.125% by weight $SiO_2$ as the sintering aid, a quantity of 188.96 g of $BaCO_3$ ($d_{50}$=1.1 $\mu$m, BET:2.1 m$^2$/g), 0.841 g of $Nd_2O_3$, 4.004 g of $CaCO_3$ ($d_{50}$=0.8 $\mu$m), 64,727 g of $TiO_2$ ($d_{50}$=0.48 $\mu$m, BET:7 m$^2$/g), 22.056 g of $ZrO_2$ ($d_{50}$=0.12 $\mu$m, BET:21.9 m$^2$/g), 0.286 g of $MnCO_3$, 0.985 g of $Y_2O_3$ and 0.36 g of $SiO_2$ (colloidal, 22 nm) is ground in a planetary ball mill for two hours and mixed. For the grinding liquid use is made of cyclohexane, and the grinding balls are made of agate. Subsequently, the mixture is ground for 24 hours by means of 2 mm-YTZ-balls in isopropanol. After grinding in the planetary ball mill, the mixture is dried under a surface evaporator in air and subsequently calcined at 1250° C. for 6 hours. Next, the powdered material is mixed with polyvinyl alcohol, which is used as the binder, and with a surface-active agent, a dispersing agent and water to form a slurry. Said slurry is processed in a doctor coater to form green ceramic foils having a thickness of 20 $\mu$m.

Said green foil is cut into foil cards, on which the pattern of the inner electrodes is printed by means of a nickel paste, whereafter said cards are stacked and compressed and divided into individual capacitors. Said capacitors are sintered at a temperature of 1320° C. The heating rate is 300° C./h up to a dwell time at 1000° C., whereafter the heating rate is 300° C./h up to 1320° C. During the sintering process, a gas mixture comprising 99% $N_2$ and 1% $H_2$ is passed through the furnace, said gas mixture being saturated with water vapor. Cooling is effected at 300° C./h. After sintering, the capacitors are tempered in a tempering furnace at a temperature of 1000° C. During said temperating process, a gas mixture comprising nitrogen and 50–100 ppm oxygen is passed through the furnace.

For the outer electrodes use is made of a vacuum-evaporated 6 nm thick CrNi layer, which is coated with 0.15 $\mu$m of Au.

Test results:

| Material | $T_c$(C) | $K_{max}$ | service life (HALT) 350° C./ 900 V |
|---|---|---|---|
| $(Ba_{0.9575}Ag_{0.0025}Ca_{0.04})$ $[Ti_{0.815}Mn_{0.0025}Nb_{0.0025}Zr_{0.18}]_{0.997}O_3$ | 16.9 | 25100 | >100 h |
| $(Ba_{0.9550}Ag_{0.0025}Nd_{0.0025}Ca_{0.04})$ $[Ti_{0.8175}Mn_{0.0025}Zr_{0.18}]_{0.997}O_3$ | 20.2 | 22600 | >450 h |
| $(Ba_{0.9575}Gd_{0.0025}Ca_{0.04})$ $[Ti_{0.815}Mn_{0.0025}Y_{0.0025}Zr_{0.18}]_{0.997}O_3$ | 21.9 | 24100 | >170 h |
| $(Ba_{0.9575}Nd_{0.0025}Ca_{0.04})$ $[Ti_{0.815}Mn_{0.0025}Er_{0.0025}Zr_{0.18}]_{0.997}O_3$ | 23.7 | 25700 | >170 h |
| $(Ba_{0.9575}Nd_{0.0025}Ca_{0.04})$ $[Ti_{0.815}Mn_{0.0025}Y_{0.0025}Zr_{0.18}]_{0.995}O_3$ | 11.9 | 25100 | >450 h |
| $(Ba_{0.9575}Nd_{0.0025}Ca_{0.04})$ $[Ti_{0.815}Mn_{0.0025}Y_{0.18}]_{0.997}O_3$ | 20.8 | 33500 | >160 h |
| $(Ba_{0.955}Nd_{0.005}Ca_{0.04})$ $[Ti_{0.8125}Mn_{0.005}Y_{0.0025}Zr_{0.18}]_{0.995}O_3$ | 27.7 | 23500 | 100 h |
| $(Ba_{0.9575}Pr_{0.0025}Ca_{0.04})$ $[Ti_{0.815}Mn_{0.0025}Ho_{0.0025}Zr_{0.18}]_{0.997}O_3$ | 19.8 | 23400 | >110 h |
| $(Ba_{0.9575}Nd_{0.0025}Ca_{0.04}$ $[Ti_{0.815}Mn_{0.0025}Yb_{0.0025}Zr_{0.18}]_{0.997}O_3$ | 20.2 | 20200 | >160 h |

I claim:

1. A capacitor comprising a ceramic dielectric of a dielectric ceramic composition, which includes a doped barium-calcium-zirconium-titanate of the composition $(Ba_{1-\alpha-\mu-v}A_\mu D_v Ca_\alpha)[Ti_{1-x-\delta-\mu'-v'}Mn_\delta A'_{\mu'}D'_{v'}Zr_x]_z O_3$, where A=Ag, A' is a member selected from the group consisting of Dy, Er, Ho, Y, Yb and Ga;

D is a member selected from the group consisting of Nd, Pr, Sm, Gd;

D' is a member selected from the group consisting of Nb or Mo $0.10 \leq x \leq 0.25$, $0 \leq \mu \leq 0.01$, $0 \leq \mu' \leq 0.01$, $0 \leq v \leq 0.01$, $0 \leq v' \leq 0.01$, $0 < \delta \leq 0.01$ and $0.995 \leq z \leq 1$ and $0 \leq \delta\alpha 0.005$, and comprising at least two electrodes.

2. A capacitor as claimed in claim 1, characterized in that the doped barium-calcium-zirconium-titanate has the composition $(Ba_{0.96-v}D_v Ca_{0.04})[Ti_{1-x-\delta-\mu'}Mn_\delta A'_{\mu'}Zr_x]_z O_3$, where A is a member selected from the group consisting of Dy, Er, Ho, Y and Yb;

D is a member selected from the group consisting of Nd, Pr, Sm and Gd;

$0.10 \leq x \leq 0.25$;

$0 \leq \mu' \leq 0.01$, $0 \leq v \leq 0.01$, $0 < \delta \leq 0.01$ and $0.995 \leq z \leq 1$.

3. A capacitor as claimed in claim 1, characterized in that the doped barium-calcium-zirconium-titanate has the composition $(Ba_{0.96-\mu-v}A_{82}D_v Ca_{0.04})[Ti_{1-x-\delta}Mn_\delta Zr_x]_z O_3$, where A=Ag, D is a member selected from the group consisting of Nb, Pr, Sm an Gd;

$0.10 \leq x \leq 0.25$;

$0 \leq \mu \leq 0.01$, $0 \leq v \leq 0.01$, $0 < \delta \leq 0.01$ and $0.995 \leq z \leq 1$.

4. A capacitor as claimed in claim 1, characterized in that the doped barium-calcium-zirconium-titanate has the composition $(Ba_{0.96-\mu}A_{\mu}Ca_{0.04})[Ti_{1-x-\delta-v'}Mn_{\delta}D'_{v'}Zr_x]_zO_3$, where A = Ag, D' = Nb or Mo, $0.10 \leq x \leq 0.25$;

$0 \leq \mu \leq 0.01$, $0 \leq v' \leq 0.01$, $0 < \delta \leq 0.01$ and $0.995 \leq z \leq 1$.

5. A capacitor as claimed in claim 1, characterized in that the doped barium-calcium-zirconium-titanate has the composition $(Ba_{0.09575}Nd_{0.0025}Ca_{0.04})[Ti_{0.995-x}Mn_{0.0025}Y_{0.0025}Zr_x]_zO_3$, where $0.18 \leq x \leq 0.22$ and $0.995 \leq z \leq 0.999$.

6. A capacitor as claimed in claim 1, characterized in that the material for the electrodes is nickel or a nickel alloy.

7. A capacitor as claimed in claim 1, characterized in that the capacitor is a multilayer capacitor comprising inner electrodes of nickel or a nickel alloy.

8. A capacitor as claimed in claim 1, characterized in that the dielectric ceramic composition comprises 0.1–1% by weight of a sintering aid.

* * * * *